(12) United States Patent
Eriksson et al.

(10) Patent No.: US 11,430,063 B2
(45) Date of Patent: Aug. 30, 2022

(54) TRADING PROPOSAL ARRANGEMENT, SYSTEM AND METHOD

(71) Applicant: C8 TECHNOLOGIES HOLDING (JERSEY) LIMITED, Jersey (GB)

(72) Inventors: Mattias Eriksson, Jersey (GB); Ebrahim Kasenally, Jersey (GB)

(73) Assignee: C8 TECHNOLOGIES HOLDING (JERSEY) LIMITED, Jersey (GB)

( * ) Notice: Subject to any disclaimer, the term of this patent is extended or adjusted under 35 U.S.C. 154(b) by 0 days.

(21) Appl. No.: 17/473,943

(22) Filed: Sep. 13, 2021

(65) Prior Publication Data
US 2021/0407007 A1    Dec. 30, 2021

Related U.S. Application Data

(63) Continuation of application No. PCT/SE2020/050199, filed on Feb. 20, 2020.

(30) Foreign Application Priority Data

Jun. 5, 2019 (SE) .................................. 1950664-1

(51) Int. Cl.
| | | |
|---|---|---|
| G06Q 40/00 | (2012.01) | |
| G06Q 40/04 | (2012.01) | |
| G06Q 40/06 | (2012.01) | |

(52) U.S. Cl.
CPC ............. *G06Q 40/04* (2013.01); *G06Q 40/06* (2013.01); *G06Q 2220/00* (2013.01)

(58) Field of Classification Search
None
See application file for complete search history.

(56) References Cited

U.S. PATENT DOCUMENTS

| | | | |
|---|---|---|---|
| 7,689,493 B1 * | 3/2010 | Sullivan | G06Q 40/06 705/36 R |
| 8,478,675 B1 | 7/2013 | Walia et al. | |

(Continued)

FOREIGN PATENT DOCUMENTS

| | | |
|---|---|---|
| WO | WO 2014091292 A1 | 6/2014 |
| WO | WO2016034542 A1 | 3/2016 |

OTHER PUBLICATIONS

Crosby, M. et al., "Blockchain Technology: Beyond Bitcoin" Applied Innovative Review (AIR) Berkeley, Jun. 2016.*

(Continued)

*Primary Examiner* — Olabode Akintola
(74) *Attorney, Agent, or Firm* — Faegre Drinker Biddle & Reath LLP

(57) ABSTRACT

In accordance with one or more embodiments herein, a system 100 for proposing rebalancing trades of financial instruments is provided. The system 100 comprises a rebalancing trading proposal arrangement 200, at least one index provider device 240, and at least one investing entity device 300, comprising a processor 310, a display 320, and input means 340. The processor 210, 310 is arranged to: display active tradable indices; receive input corresponding to a selection of an active tradable index; store the selection; receive input corresponding to an amount designated to follow the selected active tradable index; retrieve information regarding assets owned; determine the rebalancing trades needed to follow the selected active tradable index; display the rebalancing trades needed to follow the selected active tradable index; display the option to accept or decline the rebalancing trade; receive input corresponding to an accept of a displayed rebalancing trade; store information regarding the accept; retrieve the stored information about active tradable indices selected and rebalancing trades (Continued)

accepted; and transfer this information to the index provider device 240.

20 Claims, 5 Drawing Sheets

(56) References Cited

U.S. PATENT DOCUMENTS

| | | |
|---|---|---|
| 10,438,288 B1 | 10/2019 | Hartigan et al. |
| 2003/0229561 A1 | 12/2003 | Wallman |
| 2014/0365399 A1 | 12/2014 | Dennelly et al. |
| 2016/0019646 A1 | 1/2016 | Gedeon et al. |
| 2016/0364800 A1 | 12/2016 | Dennelly et al. |
| 2018/0089759 A1* | 3/2018 | Stradling ............ G06F 12/1408 |
| 2018/0143995 A1* | 5/2018 | Bailey .................... G06F 21/64 |
| 2020/0111067 A1* | 4/2020 | Strickon ............... H04L 9/0637 |
| 2020/0195682 A1* | 6/2020 | Chervoni ............ H04L 63/1408 |

OTHER PUBLICATIONS

Lorenz, J., et al., "Blockchain in Insurance-Opportunity or Threat?" Mckinsey & Company, Jul. 2016.*
International Search Report and Written Opinion dated May 20, 2020 for PCT/SE2020/050199.
Swedish Search Report dated Nov. 25, 2019 for 1950664-1.

* cited by examiner

| Execute trades | | | Cancel trades | | | |
|---|---|---|---|---|---|---|

| Proposed trades | | | | | | |
|---|---|---|---|---|---|---|
| Instrument | Description | Side | Quantity | Time | Price | |
| ES M2019 Index | S&P500 EMINI FUT Jun19 | Sell | 1 | 0,622315 | 2828,125 | |
| TY U2019 Comdty | US 10YR NOTE (CBT)Sep19 | Buy | 12 | 0,622315 | 98,02 | |
| TY M2019 Comdty | US 10YR NOTE (CBT)Jun19 | Sell | 12 | 0,622315 | 97,9475 | |
| TU U2019 Comdty | US 2YR NOTE (CBT) Sep19 | Buy | 24 | 0,622315 | 98,0325 | |
| TU M2019 Comdty | US 2YR NOTE (CBT) Jun19 | Sell | 24 | 0,622315 | 98,02 | |
| NV M2019 Curncy | NZD/USD Samba FX Outright M2019 | Buy | 100000 | 0,622315 | 116,2617188 | |

Figure 3

TRADING PROPOSAL ARRANGEMENT, SYSTEM AND METHOD

CROSS REFERENCE TO RELATED APPLICATIONS

This application is a Bypass Continuation application of PCT International Application No. PCT/SE2020/050199 filed Feb. 20, 2020, which claims the priority of Swedish Application No. 1950664-1, filed Jun. 5, 2019, each of which are herein incorporated by reference in their entirety.

TECHNICAL FIELD

The present disclosure relates generally to systems and methods for proposing trades of financial instruments, and to a trading proposal arrangement.

BACKGROUND

Many investing entities allocate their capital externally in financial funds instead of directly buying and selling financial instruments. The reason for this is that it is difficult for investing entities to be informed enough to know which financial instruments to buy or sell, and when to buy or sell them. However, the disadvantage of financial funds is that the management of the fund is costly, which means that the fees that the investing entities pay to the fund manager are often high. Further, there is limited transparency for the investing entities regarding exactly which financial instruments are actually owned.

WO2016034542 describes an apparatus for trading financial instruments in a financial trading system. The apparatus comprises a monitoring unit configured to automatically monitor opportunities to perform trading based on a plurality of systematic and fundamental strategies running over the plurality of trading agents and financial instruments, and an automated trading unit configured to automatically provide a time frame within which a crowd of clients are offered to trade collectively.

US2003229561 describes a method and apparatus for allowing an existing collectively owned investment account to specify its existing assets and percentage ownership in accounts of each of the individual owners of the collective account. This allows the distribution of some or all of the collectively owned assets to some or all of the individual owners in proportion to their ownership interest in the collective account, thereby converting some or all of the collective account into individual accounts.

U.S. Pat. No. 7,689,493 describes an asset tracker that compares an investor's portfolio to a selected index and provides recommendations to rebalance the portfolio at specified intervals. The resulting trade recommendations may be executed upon the investor's approval or automatically. The execution of the trades achieves the rebalancing of the investor's portfolio to more closely track a selected target index.

PROBLEMS WITH THE PRIOR ART

The apparatus described in WO2016034542 is related to collective trading during fixed time frames, while the method described in US2003229561 requires individual investors to have a close link with a collective account. U.S. Pat. No. 7,689,493 does not address the problem of how to acquire indices to provide in the asset tracker (probably due to the proprietor of D1 in itself being an index provider, and thus only wishing to provide its own indices).

There is thus a need for an improved system for proposing trades of financial instruments.

SUMMARY

The present disclosure relates to systems for proposing rebalancing trades of financial instruments. The claimed system may comprise: a rebalancing trading proposal arrangement comprising at least one processor and at least one storage means; at least one index provider device, arranged to transfer at least one active tradable index to the rebalancing trading proposal arrangement; and at least one investing entity device, comprising at least one processor, a display, arranged to display an investing entity interface to an investing entity, and input means, arranged to receive input from the investing entity, e.g. based on what is displayed on the investing entity interface. The at least one processor may be arranged to, for an investing entity: display the at least one active tradable index on the investing entity interface; receive input corresponding to a selection of at least one displayed active tradable index from the input means; store the selection of the at least one active tradable index in the at least one storage means; receive input corresponding to an amount designated to follow the selected at least one active tradable index from the input means; retrieve information regarding assets owned by the investing entity from the at least one storage means; determine the rebalancing trades needed to follow the selected at least one active tradable index, based on the assets owned by the investing entity and the amount designated to follow the index; display the rebalancing trades needed to follow the selected at least one active tradable index on the investing entity interface; for each of the displayed rebalancing trades, display the option to accept or decline the rebalancing trade on the investing entity interface; receive input corresponding to an accept of a displayed rebalancing trade from the input means; store information regarding the accept of the displayed rebalancing trade in the at least one storage means; retrieve the stored information about active tradable indices selected and rebalancing trades accepted from the at least one storage means; and transfer the information about active tradable indices selected and rebalancing trades accepted to the index provider device. With this system, rebalancing trades may be proposed to investing entities based on active tradable indices provided by index providers, and the index providers may receive payment based on the use of their proposed indices. The system may further comprise an index provider interface.

The present disclosure also relates to rebalancing trading proposal arrangements for proposing rebalancing trades of financial instruments. The claimed rebalancing trading proposal arrangement may comprise at least one storage means and at least one processor. The at least one processor may be arranged to: receive at least one active tradable index from an index provider; display the at least one active tradable index on an investing entity interface of an investing entity; receive a selection of at least one displayed active tradable index from the investing entity interface; store the selection of the at least one active tradable index in the at least one storage means; receive an amount designated to follow the selected at least one active tradable index from the investing entity interface; retrieve information regarding assets owned by the investing entity from the at least one storage means; determine the rebalancing trades needed to follow the selected at least one active tradable index, based on the assets owned by the investing entity and the amount designated to follow the index; display the rebalancing trades needed to follow the selected at least one active tradable index on the investing entity interface; for each of the displayed rebalancing trades, display the option to accept or decline the rebalancing trade on the investing entity interface; receive an accept of a displayed rebalancing trade from the investing entity interface; store information regarding the accept of the displayed rebalancing trade in the at least one storage means; retrieve the stored information about active tradable indices selected and rebalancing trades accepted from the at least one storage means; and transfer the information about active tradable indices selected and rebalancing trades accepted to the index provider device. With this rebalancing trading proposal arrangement, rebalancing trades may be proposed to investing entities based on active tradable indices provided by index providers, and the index providers may receive payment based on the use of their proposed indices.

The present disclosure also relates to methods of proposing rebalancing trades of financial instruments. The claimed method may comprise, for an investing entity: transferring at least one active tradable index from an index provider to a rebalancing trading proposal arrangement; displaying the at least one active tradable index on an investing entity interface; inputting a selection of at least one of the displayed active tradable indices on the investing entity interface; storing the selection of the at least one active tradable index in the at least one storage means; inputting an amount designated to follow the selected at least one active tradable index on the investing entity interface; retrieving information regarding assets owned by the investing entity from the at least one storage means; determining the rebalancing trades needed to follow the selected at least one active tradable index, based on the assets owned by the investing entity and the amount designated to follow the index; displaying the rebalancing trades needed to follow the selected at least one active tradable index on the investing entity interface; for each of the displayed rebalancing trades, displaying the option to accept or decline the rebalancing trade on the investing entity interface; inputting an accept of a displayed rebalancing trade on the investing entity interface; storing information regarding the accept of the displayed rebalancing trade in the at least one storage means; retrieving the stored information about active tradable indices selected and rebalancing trades accepted from the at least one storage means; and transferring the information about active tradable indices selected and rebalancing trades accepted to the index provider. With this method, rebalancing trades may be proposed to investing entities based on active tradable indices provided by index providers, and the index providers may receive payment based on the use of their proposed indices.

In embodiments, shared or distributed ledger technology (DLT) is used to store the information about an investing entity that views active tradable index and a rebalancing trade that has been accepted by an investing entity in order to follow active tradable index. The distributed ledger technology may e.g. be blockchain. Entries may e.g. be created to the distributed ledger each time the active tradable index is changed or used to determine and/or display rebalancing trades needed to follow the active tradable index, or each time a rebalancing trade has been accepted by an investing entity in order to follow the active tradable index. This is a simple yet reliable way of storing the information so that it can be transferred to the index provider.

In embodiments, an order to execute the accepted trade is transferred to a trade executing party, such as e.g. a bank or a broker, and information about executed rebalancing trades is received from the trade executing party. This information may be stored in the at least one storage means, so that information about the assets owned by an investing entity may later be retrieved from the at least one storage means.

In embodiments, investing entities may also make settings regarding e.g. certain financial instruments they do not wish to own, such as e.g. stock from the military industry. The active tradable indices may then be adapted for this investing entity based on these settings.

The present disclosure also relates to a non-transitory computer readable medium comprising a set of instructions which, when executed by at least one processor of an investing entity device, causes the at least one processor to: display an investing entity interface on a display of the investing entity device; display at least one active tradable index, received from an index provider, on the investing entity interface; receive input corresponding to a selection of at least one displayed active tradable index, and an amount designated to follow the at least one active tradable index, from input means of the investing entity device; transfer the selection of the at least one displayed active tradable index, and the amount designated to follow the at least one active tradable index, to a rebalancing trading proposal arrangement; receive information from the rebalancing trading proposal arrangement regarding the rebalancing trades determined to be needed to follow the selected at least one active tradable index; display the rebalancing trades determined to be needed to follow the selected at least one active tradable index on the investing entity interface; for each of the displayed rebalancing trades, display the option to accept or decline the rebalancing trade on the investing entity interface; receive input corresponding to an accept of a displayed rebalancing trade from the input means; and transfer information regarding the accept of the displayed rebalancing trade to the rebalancing trading proposal arrangement.

The term "financial instruments" in this application refers to all types of financial instruments, including stock and other types of securities. Financial instruments may e.g. be exchange listed equities, exchange listed financial futures, exchange listed commodity futures, exchange listed foreign exchange futures, exchange listed options on futures and equities, or over the counter (OTC) instruments and derivatives in rates, equities and foreign exchange.

The term "investing entity" in this application refers to any type of investing entity, including institutional investing entities. An investing entity may e.g. be an investment manager, a pension fund, and insurance fund, a family office, a fund of funds, or an endowment.

The term "active tradable index" in this application refers to the rebalancing trades needed to follow a particular investment approach provided by an index provider. An active tradable index is the performance of a set of financial instruments with the relative weightings reflecting the parameters set for this index. The investment approach for an active tradable index may e.g. correspond to that used in financial funds, such as e.g. equity funds or hedge funds.

The term "index provider" in this application refers to any issuer/provider of an active tradable index. Such an issuer/provider may e.g. be a manager of a financial fund, a quantitative researcher or trader, a discretionary researcher or trader, a financial institution, or an investment research index provider.

The at least one processor may be one processor, or a number of processors between which signals are transmitted. Some processing may e.g. take place in one processor, and signals may then be transmitted to one or more other processors for further processing. The at least one processor may e.g. be at least one processor of the rebalancing trading proposal arrangement and at least one processor of the investing entity device.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

FIG. 3 is a schematic example investing entity interface.

Embodiments of the present disclosure and their advantages are best understood by referring to the detailed description that follows. It should be appreciated that like reference numerals are used to identify like elements illustrated in one or more of the figures.

DETAILED DESCRIPTION

The present disclosure aims at enabling investing entities to benefit from the investment approaches used e.g. in financial funds without having to allocate capital in such financial funds. In order for this to be possible, there must be a way for the index providers to receive payment for investment approaches provided to investing entities who wish to buy the financial instruments directly instead.

The present disclosure relates to systems and methods for proposing rebalancing trades of financial instruments, and to a rebalancing trading proposal arrangement. The proposal relates to systems and methods that allow an investing entity to track the performance of an investment approach by proposing rebalancing trades at certain time intervals. In this way, the performance of the underlying investment approach can be tracked by the investing entity. This is in contrast to the investing entity allocating their capital externally so that a third-party manager can follow a similar investment approach. In addition, this allows the investing entity to track the investment approach as closely or loosely as desired, as the investing entity has full control of the process. Embodiments of the disclosed solution are presented in more detail in connection with the figures.

Figure 1:
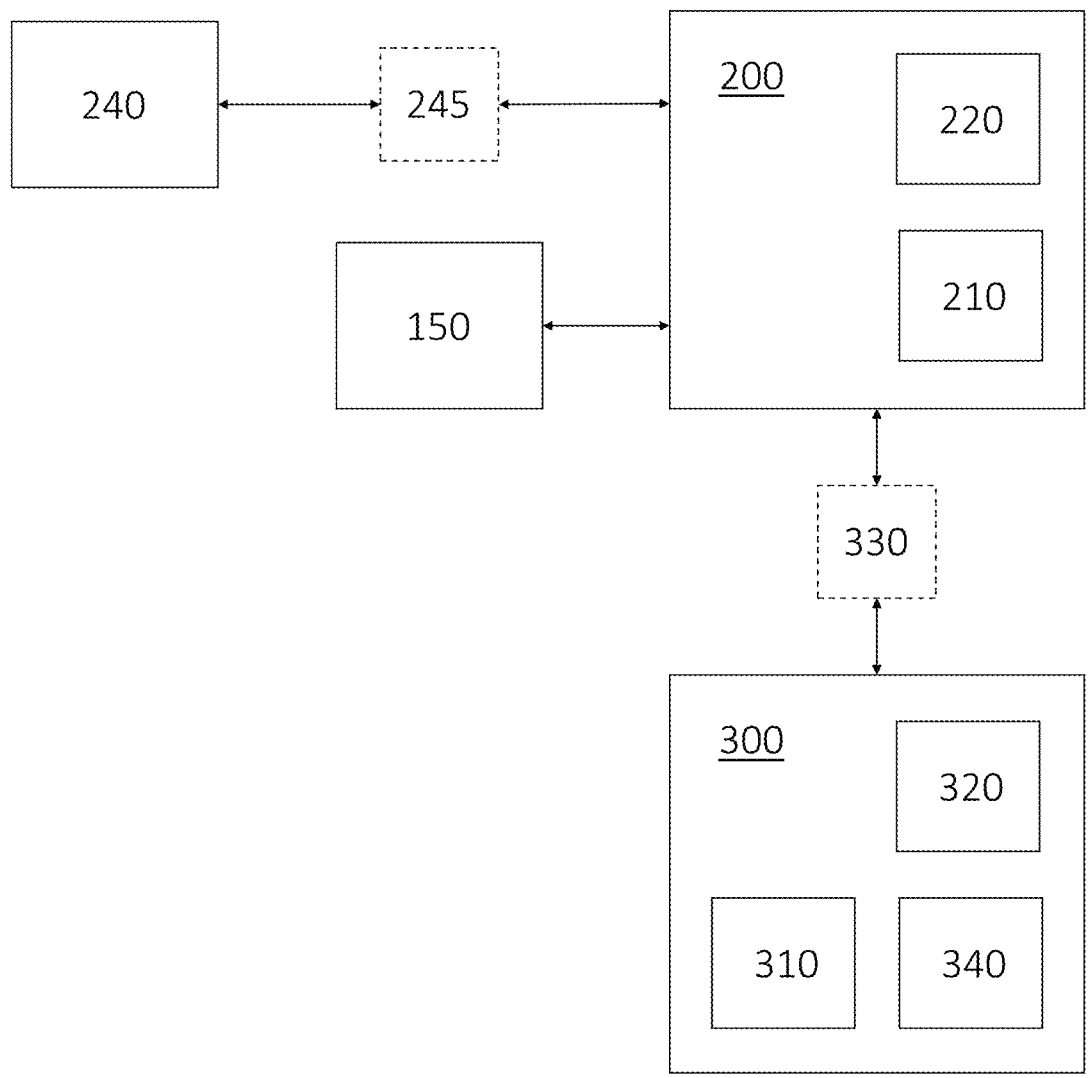
FIG. 1 schematically illustrates a system for proposing rebalancing trades of financial instruments, in accordance with one or more embodiments described herein.

FIG. 1 schematically illustrates a system 100 for proposing rebalancing trades of financial instruments, in accordance with one or more embodiments described herein. The system 100 shown in FIG. 1 comprises an index provider device 240, a rebalancing trading proposal arrangement 200, and an investing entity device 300. The index provider device 240 may be arranged to transfer active tradable indices to the rebalancing trading proposal arrangement 200, optionally through an index provider interface 245. The rebalancing trading proposal arrangement 200 shown in FIG. 1 comprises a processor 210 and storage means 220. The processor 210 may be arranged to display active tradable indices received from the index provider device 240 on an investing entity interface 330 displayed on a display 320 of the investing entity device 300. The investing entity device 300 may also comprise at least one processor 310, which may cooperate with the processor 210 of the rebalancing trading proposal arrangement 200, and input means 340, which may be arranged to receive input from an investing entity 130, e.g. based on what is displayed on the investing entity interface 330.

The input means 340 may be any type of input means that may be used by an investing entity 130 to input selections and/or other information. The input means 340 may e.g. be a touchscreen, a keyboard, and/or a mouse.

The at least one processor 210, 310 may be arranged to receive input corresponding to a selection of at least one displayed active tradable index from the input means 340. This selection may be stored in the storage means 220. The at least one processor 210, 310 may be arranged to also receive input corresponding to an amount designated to follow the selected at least one active tradable index from the input means 340. Based on information regarding assets owned by the investing entity 130 and the amount designated to follow the index, the at least one processor 210, 310 may be arranged to determine the rebalancing trades needed to follow the selected at least one active tradable index. The at least one processor 210, 310 may be arranged to display these rebalancing trades on the investing entity interface 330, together with the option to accept or decline each rebalancing trade. The user interface 330 may optionally comprise push notifications to the investing entity 130 when new rebalancing trades are proposed.

The at least one processor 210, 310 may be arranged to receive input corresponding to an accept of a displayed rebalancing trade from the input means 340. The at least one at least one processor 210, 310 may then be arranged to transfer the information about active tradable indices selected and rebalancing trades accepted to the index provider device 240. With this system 100, rebalancing trades may be proposed to investing entities 130 based on active tradable indices provided by index providers 140, and the index providers 140 may receive payment based on the use of their proposed indices.

If the index providers 140 are to receive payment based on the use of their proposed indices, this information must in a reliable way be stored and transferred from the rebalancing trading proposal arrangement 200 to the index provider device 240. One way of achieving this is to use shared or distributed ledger technology (DLT), such as e.g. blockchain. If blockchain is used, a blockchain may e.g. be created when an active tradable index is provided by an index provider 140 to the rebalancing trading proposal arrangement 200, and entries/blocks to this blockchain may be created each time the active tradable index is changed, or used to determine and/or display rebalancing trades needed to follow the active tradable index, or each time a rebalancing trade has been accepted by an investing entity 130 in order to follow the active tradable index. The information in the blockchain is preferably accessible to all parties to the blockchain. Thus, preferably a unique blockchain is created for each active tradable index in relation to each investing entity 130, since investing entities 130 may not wish other investing entities 130 to see their investments.

A distributed ledger may be a type of database that is shared, replicated, and synchronized among the nodes of a decentralized network. The distributed ledger preferably records the transactions, such as the exchange of assets, information or data, among the participants in the network.

In its simplest form, a distributed ledger is a database held and updated independently by each participant (or node) in a large network. The distribution is unique: records are not communicated to various nodes by a central authority, but are instead independently constructed and held by every node. That is, every single node on the network processes every transaction, coming to its own conclusions and then voting on those conclusions to make certain the majority agree with the conclusions.

Once there is this consensus, the distributed ledger has been updated, and all nodes maintain their own identical copy of the ledger. This architecture allows for a new dexterity as a system of record that goes beyond being a simple database.

A blockchain is a tamper-evident, shared digital ledger that records transactions in a network. Distributed to all member nodes in the network, the ledger permanently records, in a sequential chain of cryptographic hash-linked blocks, the history of asset exchanges that take place between the peers in the network.

All the confirmed and validated transaction blocks are linked and chained from the beginning of the chain to the most current block, hence the name blockchain. The blockchain thus acts as a single source of truth, and members in a blockchain network can view only those transactions that are relevant to them.

Instead of relying on a third party to mediate transactions, member nodes in a blockchain network use a consensus protocol to agree on ledger content, and cryptographic hashes and digital signatures to ensure the integrity of transactions.

Consensus ensures that the shared ledgers are exact copies, and lowers the risk of fraudulent transactions, because tampering would have to occur across many places at exactly the same time. Cryptographic hashes ensure that any alteration to transaction input, even the most minuscule change, results in a different hash value being computed, which indicates potentially compromised transaction input. Digital signatures ensure that transactions originated from senders (signed with private keys) and not imposters.

A decentralized peer-to-peer blockchain network prevents any single participant or group of participants from controlling the underlying infrastructure or undermining the entire system. Participants in the network are all equal, adhering to the same protocols. They can be individuals, state actors, organizations, or a combination of all these types of participants. At its core, the system records the chronological order of transactions with all nodes agreeing to the validity of transactions using the chosen consensus model. The result is transactions that cannot be altered or reversed, unless the change is agreed to by all members in the network in a subsequent transaction.

The rebalancing trading proposal arrangement 200 may transfer an order to execute the accepted trade from the rebalancing trading proposal arrangement 200 to a trade executing party 150, such as e.g. a bank or a broker, and receive information about executed rebalancing trades from the trade executing party 150. This information may be stored in the at least one storage means 220, so that information about the assets owned by an investing entity 130 may later be retrieved from the at least one storage means 220.

The rebalancing trading proposal arrangement 200 allows multiple index providers 140 to supply active tradable indices that generate rebalancing trading proposals that are subsequently presented to potential investing entities 130 via the rebalancing trading proposal arrangement 200. The index providers 140 must be able to receive payment based on the use of their proposed indices, but the payment does not necessarily have to be routed directly from the investing entities 130 to the index providers 140 based on the use of the proposed indices—it is also possible for the rebalancing trading proposal arrangement 200 to charge a fee from each investing entity 130 relating to the general use of the rebalancing trading proposal arrangement 200, such as e.g. relating to the amount of money invested based on the rebalancing trading proposals, or relating to the increase of the amount of money generated based on the rebalancing trading proposals. The rebalancing trading proposal arrangement 200 may then pay the index providers 140 based on the use of their proposed indices.

Figure 2:
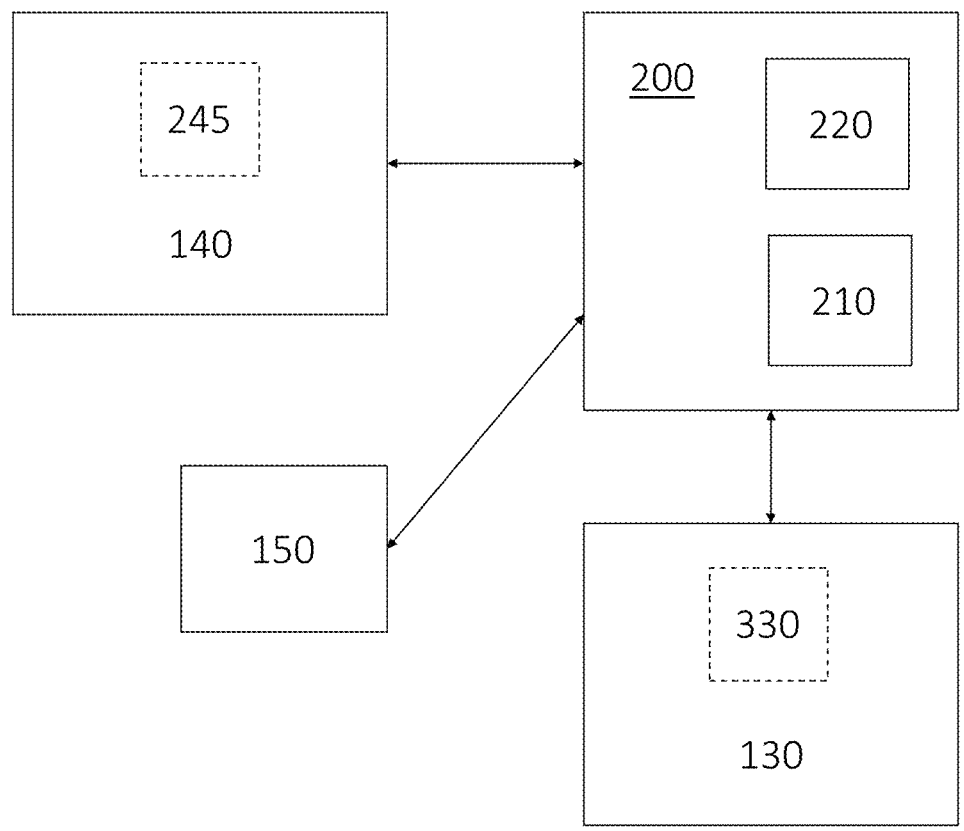
FIG. 2 schematically illustrates a rebalancing trading proposal arrangement for proposing rebalancing trades of financial instruments, in accordance with one or more embodiments described herein.

FIG. 2 schematically illustrates how a rebalancing trading proposal arrangement 200 for proposing rebalancing trades of financial instruments in accordance with one or more embodiments described herein may interact with an index provider 140, an investing entity 130 and trade executing party 150.

FIG. 3 is a schematic example investing entity interface 330, where proposed rebalancing trades based on a selected index are shown. Based on information regarding assets already owned by the investing entity 130 and the amount designated to follow the index, the rebalancing trades needed to follow the selected at least one active tradable index may be determined and displayed on the investing entity interface 330, together with the option to accept or decline each rebalancing trade. The user interface 330 may optionally comprise push notifications to the investing entity 130 when new rebalancing trades are proposed.

Various embodiments of the present disclosure will contribute to change the rigid structure of the financial services industry, as index providers 140 will be able to access investing entities 130 directly without having to accommodate numerous middlemen/sales/distribution channels that only serve to increase the costs to investing entities 130.

According to embodiments, the systems 100, methods 500 and rebalancing trading proposal arrangements 200 allow index providers 140 to connect to the system in a way that allows them to submit active tradable indices that can be presented to the investing entities 130 via the rebalancing trading proposal arrangement 200. The systems 100, methods 500 and rebalancing trading proposal arrangements 200 may also allow for an evaluation of these investment approaches prior to making them available to the group of investing entities 130. Additionally, index providers 140 may be allowed to manage their public profiles so as to be able to market their investment skills to the investing entity community. According to embodiments of the present disclosure, the systems 100 may in addition to the rebalancing trading proposal arrangements 200 also comprise a plurality of index provider devices 240, and a plurality of investing entity devices 300, such as e.g. computers and/or mobile communications devices. In embodiments, a plurality of investing entity devices 300 have installed thereon an application program, or access to the system 100 and/or the rebalancing trading proposal arrangement 200 via an internet browser application. The application program on the investing entity device 300 (computer/smartphone), or the website if accessed via a browser, may then comprise user specific log-in and account information.

In embodiments, the system 100 may also comprise a number of investing entity devices 300, such as e.g. fixed or mobile remote user terminals, all connected to the rebalancing trading proposal arrangement 200. The system may also comprise servers and storage means outside of the rebalancing trading proposal arrangement 200.

In embodiments, each investing entity device 300 has installed thereon an application program comprising client computer specific log-in information. The system may further comprise user interfaces 245, 330 for communication with the plurality of investing entity devices 300 and/or the index provider devices 240.

In accordance with embodiments of the present disclosure, some or all of the investing entity devices 300 are located outside an access protected trusted environment. For example, at least some of the investing entity devices 300 are portable client computers or portable electronic telecommunications devices such as mobile radios or digital cellular mobile telephones, such as smartphones or tablet computers that have a communication interface.

In embodiments, the investing entity interface 330 only interacts with the rebalancing trading proposal arrangement 200, preferably via a security layer.

Various embodiments of the present disclosure can be integrated into a simple user-friendly computer application product, a so-called "app", which can be downloaded and installed on an investing entity device 300 such as a wireless communication device such as a smart device, in particular a smart phone. After registration is achieved, an investing entity 130 will have access to the rebalancing trading proposal arrangement 200 to simulate rebalancing trading. This means that the investing entity 130 now has access to the list of active tradable indices presented by the rebalancing trading proposal arrangement 200. Various settings may be applied to assist in managing a selected index to suit the specific requirements of an investing entity 130. In achieving this, the barrier that may exist between investing entities and sophisticated investment approaches will have been removed.

An advantage is that investing entities 130 will have access to a plurality of investment approaches listed on the investing entity interface 330, which are generated based on the kinds of investment approaches utilized at financial funds, proprietary trading firms and other sophisticated investment companies. The architecture of the system 100 allows numerous investing entities 130 worldwide to trade in financial instruments across numerous venues.

The present disclosure intends to level the playing field by presenting investment ideas of a quality that is similar to that of professional money managers without the high costs. The rebalancing trading proposal arrangement 200 disclosed allows investing entities 130 via their investing entity devices 300 to select an active tradable index from a plurality of listed indices providing rebalancing trades and, by doing so, allowing investing entities 130 to reduce their trading costs for advanced investment approaches.

In embodiments, the present disclosure describes storage means 220 for storing events related to a particular active tradable index in relation to a particular investing entity 130, the system 100 comprising a rebalancing trading proposal arrangement 200 and a plurality of index provider devices 240, each index provider device 240 having installed thereon an application program, the application program comprising client computer specific log-in information, said system further comprising an index provider interface 245 for communication with the plurality of index provider devices 240.

In embodiments, the present disclosure describes a system 100 comprising a rebalancing trading proposal arrangement 200 and a plurality of investing entity devices 300, each investing entity device 300 having installed thereon an application program, the application program comprising client computer specific log-in information, said system further comprising an investing entity interface 330 for communication with the plurality of investing entity devices 300.

In embodiments, the present disclosure describes a computer program application product comprising instructions that are executable by a client computer, the computer program product being an application program for providing a method of proposing rebalancing trades of financial instruments, the application program being operational to trigger or instruct the processor 210 of the rebalancing trading proposal arrangement 200 to receive and write data items to the storage means 220.

In embodiments, data or information indicating that an active tradable index has been viewed by an investing entity 130 and/or that rebalancing trades have been made based on the index is stored and/or transferred back to the index provider 140. In certain embodiments, the data or information indicating that an index has been viewed by an investing entity 130 and that rebalancing trades have been made based on the active tradable index may then be stored and transferred back to the index provider 140 using shared or distributed ledger technology (DLT), such as e.g. blockchain. This enables the index provider 140 to be certain that the index is not viewed by anyone who does not pay for the information, and it also enables the investing entities 130 to be certain that an index is actually delivered by the index provider 140 that has been specified, and can thus be trusted.

In accordance with certain embodiments, a computerized system for managing active tradable indices, corresponding to investment approaches, over a network is disclosed. The system may include a plurality of computing devices that are in communication with one another over a peer-to-peer communication network. Each of the computing devices may include a processor and a physical storage medium that stores at least a portion of a distributed ledger, such as e.g. a distributed blockchain ledger, that includes a distributed database that records information about events associated with indices that occur on the peer-to-peer communication network.

In accordance with certain embodiments, a method for managing active tradable indices over a network is disclosed. The method may include the steps providing a plurality of computing devices with access to a peer-to-peer communication network, and storing at least a portion of a distributed ledger, such as e.g. a distributed blockchain ledger, on the plurality of computing devices. The distributed ledger may include a distributed database that records information about events associated with active tradable indices or transactions that occur on the peer-to-peer communication network.

The network may utilize a blockchain that includes a ledger, e.g. a blockchain ledger, that is distributed among computing devices on the network. In certain embodiments, the network utilizes a blockchain that is available to users who have registered with the rebalancing trading proposal arrangement 200. When an index provider 140 creates a new active tradable index, the index and its associated data are stored directly on the ledger itself and are represented as one or more entries, or blocks, on the blockchain.

The present techniques can be utilized to create or virtualize any event data, and the event data can be stored on the blockchain. For each active tradable index that is created, the blockchain may be appended with an entry that includes a dataset that represents the index itself. An exemplary dataset may include any event data or information that is relevant to the index, including, but not limited to, information about an index viewed or rebalancing trade made. In certain embodiments, some or all of the dataset associated with the index (including related files or documentation) may be stored on a server and the entry in the blockchain corresponding to the index may include a key or cypher than enables the data to be unlocked and retrieved. Once an index is created, investing entities 130 can access the system to obtain comprehensive and detailed information pertaining to all financial instruments or securities associated with the index, thus providing investing entities 130 with the information necessary to make decisions regarding transactions.

Embodiments may include a computer program product accessible from a computer-usable or computer-readable medium providing program code for use by or in connection with a computer or any instruction execution system. A computer-usable or computer-readable medium may include any apparatus that stores, communicates, propagates or transports the program for use by or in connection with the instruction execution system, apparatus, or device. The medium can be a magnetic, optical, electronic, electromagnetic, infrared, or semiconductor system (or apparatus or device) or a propagation medium. The medium may e.g. include a computer-readable storage medium such as a semiconductor or solid state memory, a magnetic tape, a removable computer diskette, a random access memory (RAM), a read-only memory (ROM), a rigid magnetic disk, and/or an optical disk.

In embodiments, the system 100 may utilize blockchain and virtual data token technology to provide a compliant framework for handling event data and issuing, trading, archiving, clearing, settling, and recording transactions. Each time an index provider 140 desires to list an index, or an investing entity 130 desires to accept a rebalancing trade, the user's cryptographic means can provide access to a peer-to-peer network in which the distributed ledger is stored on and maintained by the users' computing devices. The distributed ledger may be utilized to facilitate transactions in the system in several different ways, including those which involve providing the index providers 140 with event information.

According to certain embodiments of the technology disclosed, the data tokens and the distributed ledger may be embedded with information pertaining to the active tradable index, its ownership, its issuer (the index provider 140) and any other relevant information.

Exemplary information that may be embedded into the data tokens and distributed ledger may include:

(1) Index Provider ID: Before an index provider 140 is permitted to list indices on the system, the index provider 140 may submit a request (e.g. via a web-based input form or cryptographic means) to create an index provider account with the rebalancing trading proposal arrangement 200. In certain embodiments, an administrative user may be required to approve the request. Upon approval of the request, the index provider 140 is assigned an ID (e.g. consisting of alpha-numeric characters) which uniquely identifies the index provider 140, the index provider's cryptographic means and/or its associated account. The rebalancing trading proposal arrangement 200 may embed the ID into all data tokens and blockchain entries associated with securities that are offered by the index provider 140.

(2) Investing entity ID: Before an investing entity 130 is permitted to receive proposals for rebalancing trades of securities/financial instruments, the investing entity 130 may be required to submit a request to create an investing entity account with the rebalancing trading proposal arrangement 200. In certain embodiments, an administrative user may be required to approve the request. Upon approval of the request, the investing entity 130 may be assigned an ID that uniquely identifies the investing entity 130 and its associated account. Each time the investing entity 130 makes a rebalancing trade associated with an index on the rebalancing trading proposal arrangement 200, the embedded information of the associated data token and distributed ledger are updated with the investing entity's ID to indicate the rebalancing trade made.

(3) Active Tradable Index ID: Each time an index provider 140 desires to list a new active tradable index, the index provider 140 may be required to submit a request to create the new offering on the rebalancing trading proposal arrangement 200. In certain embodiments, an administrative user may be required to approve the request. Upon approval of the request, the rebalancing trading proposal arrangement 200 assigns the new active tradable index a unique ID, which identifies the associated proposed rebalancing trades and may be embedded into the data tokens and distributed ledger entries for the proposed rebalancing trades.

(4) Security Type Data: The data tokens and distributed ledger may include embedded information that identifies the type of financial instruments associated with each active tradable index being offered on the system.

Each time an event associated with an active tradable index has been identified, the information embedded in the data token may be updated and a new entry may be added to the distributed ledger which references one or more of the previous entries associated with the active tradable index. The entries on the ledger record and confirm when and in what sequence events and transactions occur. The entries in the distributed ledger are used to track events occurred, and can be used to validate any and all events and transactions related to the active tradable index.

In embodiments, the distributed ledger may be implemented utilizing a decentralized architecture in which the distributed ledger is stored and maintained on a plurality of computing nodes (e.g. associated with index providers 140, investing entities 130, and/or administrators) that form a peer-to-peer network. The distributed ledger may represent an immutable, append-only, ledger that maintains a distributed database providing details and timestamp information of all events and transactions that have ever taken place on the system. In certain embodiments, the protocols utilized by the cryptographic means may be applied to implement a consensus-based system which requires a specific state or set of values to be agreed upon by some or all of the computing devices, without the need to trust or rely upon a centralized authority, in order to conduct transactions and append entries or blocks to the distributed ledger. Any known consensus protocol may be utilized by the system.

Entries that are added to the distributed ledger may link to previous entries or blocks already included in the distributed ledger. Each entry being added to the distributed ledger may refer to the most recently added entry (e.g. by referencing a hash value associated with the prior entry) in the ledger which is associated with the active tradable index, thus creating an audit trail that leads to the initial entry or set of entries associated with the providing of the active tradable index. For example, the entries that are added to the distributed ledger for a particular index may link back to specific events or transactions that are associated with a particular offering involving the index and all entries pertaining to rebalancing trades based on the index. The linkage among the transactions in the distributed ledger permits the system and computing nodes to follow the chain backward in order to observe and verify all transactions associated with the active tradable indices and their associated virtual data tokens.

As mentioned above, the entries in the distributed ledger are embedded with information that is associated with each transaction. For example, each time an active tradable index is initially provided, an entry may be added to the distributed ledger and the entry may include embedded information that identifies the index provider 140, and any other relevant information associated with the index. This may involve incorporating associated index provider IDs and product IDs into the entry.

The distributed ledger may be updated with new entries to identify any event relevant to an active tradable index. In certain embodiments, the distributed ledger may also be updated to reflect events pertaining to restrictions that are imposed on active tradable indices.

Preferably, the system 100 may include various features that permit index providers 140 and investing entities 130 to conduct all activities and transactions electronically through the rebalancing trading proposal arrangement 200 using their computing devices (e.g. by using e-signatures and other features that enable easy processing of documents and transactions) and without requiring any manual tasks to be performed using printed or hardcopy paperwork. In certain embodiments, the system 100 (e.g. via the rebalancing trading proposal arrangement 200 and/or cryptographic means) utilizes client relationship management ("CRM") software to facilitate all functions in a regulatory compliant manner, including functions associated with onboarding tasks (e.g. onboarding of new index providers 140 or investing entities 130), facilitating rebalancing trades, and archiving event data and transactions. Additional details regarding several of these functions are described below.

In certain embodiments, the onboarding of active tradable indices may be performed without the participation of an administrator. In other embodiments, all requests submitted by index providers 140 may be made available to administrators via accounts on the rebalancing trading proposal arrangement 200 or their cryptographic means. The administrators can view any details, and track the progress of any request that is submitted by the index providers 140. The administrators may vet the requests (e.g. for compliance with regulations and laws) and determine whether or not to approve the requests based on the information that is provided by the index providers 140. Upon approval of a request, the rebalancing trading proposal arrangement 200 may create a new active tradable index and assign it a unique ID. A distributed ledger may be created for the active tradable index. All or a portion of the above-described activities may be performed as part of an index and the distributed ledger can be appended to reflect the initiation of a rebalancing trade, performance of the contractual obligations and confirmation/denial of a rebalancing trade.

An individual or entity may register an account with the rebalancing trading proposal arrangement 200 to become an investing entity 130 who is eligible to follow an active tradable index and receive proposals to purchase and/or sell financial instruments in the system. However, even before registering, the potential investing entity 130 may be permitted to access the "actionable knowledge" within the rebalancing trading proposal arrangement 200 that provides detailed information pertaining to the listed indices, but may be barred from receiving any rebalancing trading proposals until an account is registered and approved, and the user is provided with a cryptographic means. The rebalancing trading proposal arrangement 200 may store or include its own cryptographic means which is utilized to access the information stored on the distributed ledger and the retrieved information may be presented via the rebalancing trading proposal arrangement 200 (e.g. via a website).

The potential investing entity 130 may be required to fill out an input form that is accessible via the rebalancing trading proposal arrangement 200 or a cryptographic means in order to register an account. The potential investing entity 130 may be required to provide personal information (e.g. name, e-mail address, residence address and other related information) and to accept the terms of use and other agreements associated with the rebalancing trading proposal arrangement 200.

The information about identified events related to a particular index may be stored in the storage means 220 or distributed ledger, and thereafter made accessible to the index provider 140. The distributed ledger may also be utilized to verify transfer transactions and virtual data tokens exchanged among the cryptographic means. The distributed ledger can be utilized to verify transactions in a variety of different ways. For example, in certain embodiments, before an asset transfer occurs, the cryptographic means may analyze the distributed ledger to identify all relevant entries that are linked to, or otherwise associated with, the index or which is the subject of the occurred event.

The at least one processor 210 of the rebalancing trading proposal arrangement 200 may further be configured to identify events associated with a particular active tradable index listed. The information about the identified event may be at least one of automatically transferred back from the rebalancing trading proposal arrangement 200 to the index provider 140 in a message, e.g. an automatically dispatched message, and/or presented on an index provider interface 245 of the rebalancing trading proposal arrangement 200, where the information about the event may be presented on the index provider interface 245 with restricted access so that only the index provider 140 has access to the information. The events may include at least one of: an active tradable index has been viewed or selected; a rebalancing trade needed to follow a particular index has been accepted; and/or a rebalancing trade based on a particular index has been made.

In some embodiments and in response to the at least one processor 210 of the rebalancing trading proposal arrangement 200 having identified that at least one of: an active tradable index has been viewed/selected, a rebalancing trade needed to follow a particular index has been accepted; and/or a rebalancing trade to follow a particular index has been made; the at least one processor 210 of the rebalancing trading proposal arrangement 200 may be configured to dispatch, preferably automatically, a data message to inform the index provider 140 that this event has occurred. In embodiments, information about rebalancing trades made based on the index may be automatically transferred back to the index provider 140. This enables the index provider 140 to charge for the information provided by providing the index.

In embodiments, information about recorded events, e.g. that an index has been viewed or that a rebalancing trade has been made, may be automatically triggered to the transferred to the index provider 140 in substantially real-time. In certain embodiments and upon notification and/or identification of the occurrence of an event associated with an index, e.g. that a rebalancing trade has been made or that an index has been viewed, a control/monitoring unit of the rebalancing trading proposal arrangement 200 may be configured to automatically send a message containing data or information about the occurred event to the index provider 140. Upon receipt of the message from the control/monitoring unit, the index provider 140 may be allowed to communicate with and/or charge the investing entity 130 via the rebalancing trading proposal arrangement 200. In certain embodiments, the control/monitoring unit of the rebalancing trading proposal arrangement 200 may be part of, or communicatively coupled to, a ledger administration server and a distributed ledger comprised in or associated with the rebalancing trading proposal arrangement 200.

In embodiments of the present disclosure, a data table having a plurality of identified/recorded events, e.g. that an index has been viewed or a rebalancing trade made, may be modified in substantially real-time.

In embodiments, the present disclosure relates to processing event data which relates to a particular active tradable index and/or rebalancing trades proposed to follow a particular active tradable index using a computer network that stores a distributed ledger, and particularly, to updating information related to the active tradable index in a distributed ledger based on data received from the system 100 and/or rebalancing trading proposal arrangement 200 that each are configured to store a portion of the information about an event corresponding to a respective active tradable index. The systems and methods described herein may employ the distributed ledger to control visibility to index providers 140 and/or investing entities 130, but still provide swift information about indices viewed and rebalancing trades made, which are each associated with at least one specific active tradable index, to the index provider 140 of each active tradable index.

In embodiments, the system 100 includes a ledger administration server that controls a ledger to allow for the distribution and transferring of information about events related to an active tradable index back to the index provider 140 to occur in real-time or substantially real-time. The ledger administration server may then be configured to list and control information associated with the active tradable indices by identifying and/or recording any or certain events associated with each of the indices, e.g. if an index is viewed by an investing entity 130 or if a rebalancing trade based on an index is made.

In embodiments, the ledger administration server may then be configured to convey and/or transfer the recorded information about a viewed index or a rebalancing trade made back to the index provider 140. In certain embodiments, the system may be configured to create a data table that records provided active tradable indices, index providers 140 and the information associated with each active tradable index held by the index provider 140. Certain embodiments include a validation process that provides each index provider 140 with view/approval access to information about events associated with the active tradable index, but that may provide no or only restricted access to a portion of that information to investing entities 130.

In embodiments, the ledger administration server may be configured to store copies of the data tables, which include information about indices viewed, rebalancing trades selected to follow an index and/or rebalancing trades made, e.g. in the storage means 220. At least a portion of this stored information associated with a particular index may be accessible to the index provider 140 of the particular index, which enables the index provider 140 to charge for the information about investment approaches provided by providing the index.

In embodiments, redundant copies of the data tables, which include information about indices viewed, rebalancing trades selected to follow an index and/or rebalancing trades made, may be stored at a ledger administration server and at least one other server. The distributed storage of the data tables may provide additional protection from attempts to falsify information stored in the data tables of the ledger because more than one server would need to be compromised.

In embodiments, the system 100 is a distributed computer system that maintains and updates a distributed ledger. The distributed computer system may then include a ledger administration server. In certain embodiments, the distributed computer system may further comprise at least one of an account operator server, an asset validation server, a proxy validation server, and/or a KYC validation server. The ledger administration server may be communicatively coupled directly to the devices of the investing entities 130 and/or the index providers 140, e.g. through an account operator server. In one example embodiment, the servers of the distributed computer system may be standalone servers that are connected to one another through suitable network interfaces. In another example, the distributed computer system may be implemented in a cloud-based computing environment. In that case, the servers of the computer system may each be implemented as a virtual machine that runs on one or more physical servers.

In embodiments, the data messages may include electronic signatures appended by the client devices. In certain embodiments, the system 100 uses cryptographic codes to authenticate electronic signatures appended to data messages by comparing the electronic signatures to hashes obtained from processing the data messages with a public key of the signing party. These electronic signatures may be processed by the ledger administration server to verify that the data messages were sent from the client device and authorized by the respective accountholder. Responsive to verifying the electronic signatures, the ledger administration server may employ a processor to identify the assets associated with the transaction, check available balances, and perform KYC validation.

In embodiments, the ledger administration server is configured to automatically store a master copy of the distributed ledger, which includes information about occurred events for all indices (which may or may not be accessible to the index providers 140). In certain embodiments, the ledger administration server may employ a processor to process transactions received in form of data messages from index providers 140 and/or investing entities 130, e.g. through an account operator server. A proposed rebalancing trade based on an active tradable index may involve a single asset or multiple assets.

The at least one processor 210, 310 of the system 100 may be configured to handle and distribute information about transactions and events, e.g. that an index has been viewed or that a rebalancing trade has been selected or made, associated with indices and transactions. The at least one processor 210, 310 may also be configured for processing received event data and/or transactions to reconcile the events/transactions with each of a plurality of devices providing nodes within the distributed ledger. The process of reconciliation may include sequencing of the transactions. The sequencing may be such that the transactions share the same sequence as each of the plurality of nodes. The at least one processor 210, 310 may further be configured to reconcile the event data and transactions by grouping event data and/or valid transactions into a block, calculating a satisfactory hash for the block based upon a previous consensus block in a chain of blocks, broadcasting the block to the other nodes, and using the longest chain of blocks to replace the consensus block.

According to embodiments there is provided a device for providing a node within a distributed ledger, wherein at least a part of the device is modified into a non-functional state when the device is physically compromised.

The at least one storage means 220 may be configured to store a transaction/event memory pool. The at least one storage means 220 may be further configured to store a reconciled transaction/event list. In one embodiment, the transaction memory pool may be encrypted by one or more encryption keys and the at least one processor may 210, 310 be further configured to decrypt the memory pool. In this embodiment, the processor may e.g. be a FPGA (field-programmable gate array) incorporating the one or more encryption keys in hardware, or the encryption keys may be stored in a portion of the memory. The memory may include mutable memory (such as e.g. RAM or flash memory) for dynamic data such as transactions, and immutable memory (such as e.g. ROM) for static data such as encryption keys. It will be appreciated that, in this context, immutable memory may also include difficult to modify memory such as e.g. EPROMs.

It should be recognized that numerous variations can be made to the above-described systems and methods without departing from the scope of the invention. For example, although certain embodiments may utilize a decentralized ledger that is implemented without the need for a centralized repository (e.g. on a server) or centralized administrator to process transactions, it should be recognized that alternative embodiments may utilize a centralized distributed ledger. For example, the rebalancing trading proposal arrangement 200 may utilize a centralized distributed ledger that is administered by one or more entities that maintain and control the rebalancing trading proposal arrangement 200, governmental organizations, regulatory authorities, or other private organizations that are licensed to do so.

Method Embodiments

Figure 4:
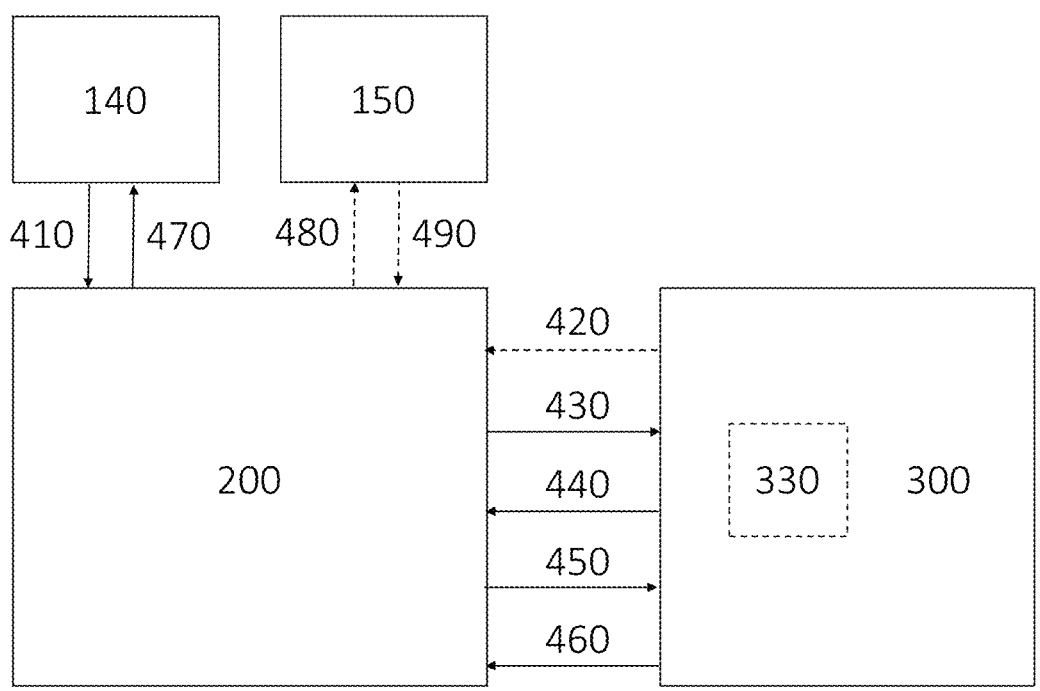
FIG. 4 is an example flow diagram of a method of proposing rebalancing trades of financial instruments, in accordance with one or more embodiments described herein.

FIG. 4 is an example flow diagram of a method of proposing rebalancing trades of financial instruments, in accordance with one or more embodiments described herein. The flow is as follows:

Step 410: transferring at least one active tradable index from an index provider 140 to a rebalancing trading proposal arrangement 200.

Step 420 (optional): transferring settings made by an investing entity 130 using input means 340 of the investing entity device 300, to the rebalancing trading proposal arrangement 200. This optional step may take place at any point during the described flow.

Step 430: displaying the at least one active tradable index on an investing entity interface 330 on a display 320 of an investing entity device 300. If settings have been made by the investing entity 130 in the optional step 420, the displaying of the at least one active tradable index may be adapted based on these settings.

Step 440: transferring a selection of at least one of the displayed active tradable indices, and an amount designated to follow the selected at least one active tradable index, which have been inputted using input means 340 of the investing entity device 300, to the rebalancing trading proposal arrangement 200.

Step 450: displaying the rebalancing trades that have been determined to be needed to follow the selected at least one active tradable index, together with the option to accept or decline each rebalancing trade, on the investing entity interface 330. If settings have been made by the investing entity 130 in the optional step 420, the determination of the rebalancing trades to be displayed may be adapted based on these settings.

Step 460: transferring information regarding acceptance of the displayed rebalancing trades to the rebalancing trading proposal arrangement 200.

Step 470: transferring information about active tradable indices selected and rebalancing trades accepted from the rebalancing trading proposal arrangement 200 to the index provider 140. This step may take place at any point after step 460.

Step 480 (optional): transferring an order to execute the accepted trade from the rebalancing trading proposal arrangement 200 to a trade executing party 150, such as e.g. a bank or a broker.

Step 490 (optional): transferring information about executed rebalancing trades from the trade executing party 150 to the rebalancing trading proposal arrangement 200. This information may be stored in the at least one storage means 220, so that information about the assets owned by an investing entity 130 may later be retrieved from the at least one storage means 220.

Figure 5:
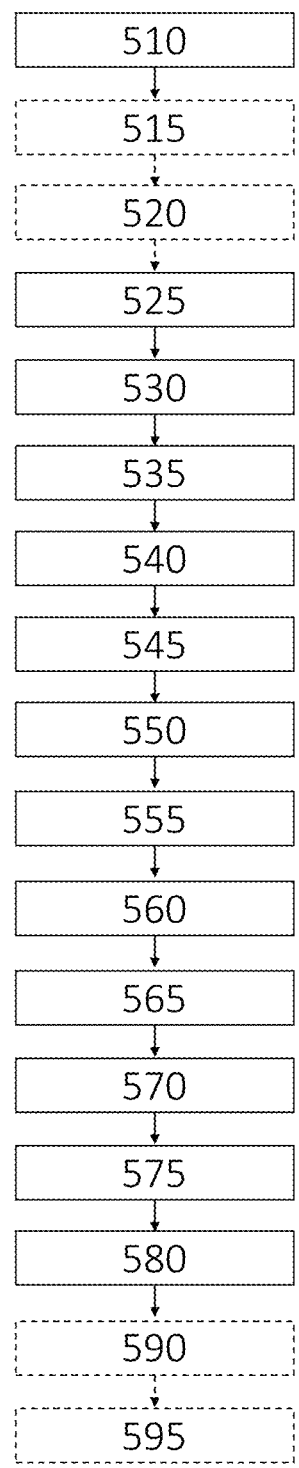
FIG. 5 schematically illustrates a method of proposing rebalancing trades of financial instruments, in accordance with one or more embodiments described herein.

FIG. 5 schematically illustrates a method 500 of proposing rebalancing trades of financial instruments, in accordance with one or more embodiments described herein. The method 500 may comprise, for an investing entity 130:

Step 510: transferring at least one active tradable index from an index provider 140 to a rebalancing trading proposal arrangement 200.

Step 525: displaying the at least one active tradable index on an investing entity interface 330.

Step 530: inputting a selection of at least one of the displayed active tradable indices on the investing entity interface 330.

Step 535: storing the selection of the at least one active tradable index in the at least one storage means 220.

Step 540: inputting an amount designated to follow the selected at least one active tradable index on the investing entity interface 330.

Step 545: retrieving information regarding assets owned by the investing entity 130 from the at least one storage means 220.

Step 550: determining the rebalancing trades needed to follow the selected at least one active tradable index, based on the assets owned by the investing entity 130 and the amount designated to follow the index.

Step 555: displaying the rebalancing trades needed to follow the selected at least one active tradable index on the investing entity interface 330.

Step 560: for each of the displayed rebalancing trades, displaying the option to accept or decline the rebalancing trade on the investing entity interface 330.

Step 565: inputting an accept of a displayed rebalancing trade on the investing entity interface 330.

Step 570: storing information regarding the accept of the displayed rebalancing trade in the at least one storage means 220.

Step 575: retrieving the stored information about active tradable indices selected and rebalancing trades accepted from the at least one storage means 220.

Step 580: transferring the information about active tradable indices selected and rebalancing trades accepted to the index provider 140.

With this method, rebalancing trades may be proposed to investing entities 130 based on active tradable indices provided by index providers 140, and the index providers 140 may receive payment based on the use of their proposed indices.

Not all of the steps listed above have to be carried out in the listed order. For example, step 545 may be carried out at any point before step 550, and step 570 and step 580 may both take place at any point after step 565.

In embodiments, the storing 535 of the selection of the at least one active tradable index, and the storing 570 of the information regarding the accept of the displayed rebalancing trade, comprise, for each active tradable index, using shared or distributed ledger technology (DLT) to store the information about each investing entity 130 that views the active tradable index and each rebalancing trade that has been accepted by an investing entity 130 in order to follow it. The distributed ledger technology may e.g. be blockchain.

The method 500 may further comprise one or more of the following steps:

Step 515: creating entries to the distributed ledger each time the active tradable index is changed or used to determine and/or display rebalancing trades needed to follow the active tradable index, or each time a rebalancing trade has been accepted by an investing entity 130 in order to follow the active tradable index.

Step 520: receiving settings made by an investing entity 130. This step may be carried out at any point. If such settings have been received before step 525, the displaying 525 of the at least one active tradable index on the investing entity interface 330 may comprise to, in response to such settings, display combinations and/or adaptions of active tradable indices on the investing entity interface 330.

Step 590: transferring an order to execute the accepted rebalancing trade to a trade executing party 150, such as e.g. a bank or a broker. This step may be carried out at any point after step 565.

Step 595: receiving information about executed rebalancing trades from the trade executing party 150. This information may be stored in the at least one storage means 220, so that information about the assets owned by an investing entity 130 may later be retrieved from the at least one storage means 220.

The foregoing disclosure is not intended to limit the present invention to the precise forms or particular fields of use disclosed. It is contemplated that various alternate embodiments and/or modifications to the present invention, whether explicitly described or implied herein, are possible in light of the disclosure. Accordingly, the scope of the invention is defined only by the claims.

Further, as explained above, not all of the steps of the claims have to be carried out in the listed order. All technically meaningful orders of the steps are covered by the claims.

The invention claimed is:

1. A system for proposing rebalancing trades of financial instruments, the system comprising:
   a rebalancing trading proposal arrangement comprising at least one processor and storage;
   at least one index provider device, arranged to transfer at least one active tradable index to the rebalancing trading proposal arrangement; and
   at least one investing entity device, comprising at least one processor, a display, arranged to display an investing entity interface to an investing entity, and an input device, arranged to receive input from the investing entity based on what is displayed on the investing entity interface;
   wherein the at least one processor of the at least one investing entity device is arranged to:
   display the at least one active tradable index on the investing entity interface;
   receive input corresponding to a selection of at least one displayed active tradable index from the input device;
   store the selection of the at least one active tradable index as information about active tradable indices selected in the storage;
   receive input corresponding to an amount designated to follow the selected at least one active tradable index from the input device;
   retrieve information regarding assets owned by the investing entity from the storage;
   determine the rebalancing trades needed to follow the selected at least one active tradable index, based on the assets owned by the investing entity and the amount designated to follow the index;
   display the rebalancing trades needed to follow the selected at least one active tradable index on the investing entity interface;
   for each of the displayed rebalancing trades, display an option to accept or decline the rebalancing trade on the investing entity interface;
   receive input corresponding to an acceptance of a displayed rebalancing trade from the input device;
   store information regarding the acceptance of the displayed rebalancing trade as information about rebalancing trades accepted in the storage;
   retrieve the stored information about active tradable indices selected and rebalancing trades accepted from the storage;
   transfer the information about active tradable indices selected and rebalancing trades accepted to the index provider device;
   creating, for each active tradable index of the active tradable indices transferred to the index provider device, an entry into a unique distributed ledger, the unique distributed ledged created for each active tradable index in relation to the investing entity, the unique distributed ledger being a database that is shared, replicated, and synchronized among a plurality of nodes of a decentralized network;
   transferring the entry created in the unique distributed ledger to each node of the plurality of nodes of the decentralized network;
   receiving a second entry created for the unique distributed ledger from a node of the plurality of nodes on the decentralized network;

determining whether the second entry is non-fraudulent based on i) a consensus protocol with each node of the plurality of nodes of the decentralized network, ii) cryptographic hashes, and iii) digital signatures; and appending the second entry in the unique distributed ledger when the second entry is determined to be non-fraudulent.

2. The system according to claim 1, wherein the unique distributed ledger stores the information about an investing entity that views the active tradable index and a rebalancing trade that has been accepted by an investing entity in order to follow the rebalancing trade.

3. The system according to claim 2, wherein the unique distributed ledger is blockchain.

4. The system according to claim 2, wherein, each time at least one of the active tradable index is changed, used to determine rebalancing trades are needed to follow the active tradable index, and a rebalancing trade has been accepted by an investing entity in order to follow the active tradable index, an entry is created in the unique distributed ledger.

5. The system according to claim 1, wherein the at least one processor of the at least one investing entity device is further arranged to:

transfer an order to execute the accepted rebalancing trade to a trade executing party; and receive information about executed rebalancing trades from the trade executing party.

6. The system according to claim 1, further comprising an index provider interface.

7. The system according to claim 1, wherein the at least one processor of the at least one investing entity device is further arranged to:

receive input corresponding to settings made by the investing entity from the input device; and in response to such settings, display at least one of i) combinations, ii) adaptions, and iii) combinations and adaptations of active tradable indices on the investing entity interface.

8. A rebalancing trading proposal arrangement for proposing rebalancing trades of financial instruments, the rebalancing trading proposal arrangement comprising a storage and at least one processor, wherein the at least one processor is arranged to:

receive at least one active tradable index from an index provider;

display the at least one active tradable index on an investing entity interface of an investing entity;

receive a selection of at least one displayed active tradable index from the investing entity interface;

store the selection of the at least one active tradable index as information about active tradable indices selected in the storage;

receive an amount designated to follow the selected at least one active tradable index from the investing entity interface;

retrieve information regarding assets owned by the investing entity from the storage;

determine the rebalancing trades needed to follow the selected at least one active tradable index, based on the assets owned by the investing entity and the amount designated to follow the index;

display the rebalancing trades needed to follow the selected at least one active tradable index on the investing entity interface;

for each of the displayed rebalancing trades, display the option to accept or decline the rebalancing trade on the investing entity interface;

receive an acceptance of a displayed rebalancing trade from the investing entity interface;

store information regarding the acceptance of the displayed rebalancing trade as information about rebalancing trades accepted in the storage;

retrieve the stored information about active tradable indices selected and rebalancing trades accepted from the storage;

transfer the information about active tradable indices selected and rebalancing trades accepted to the index provider device;

create, for each active tradable index of the active tradable indices transferred to the index provider device, an entry into a unique distributed ledger, the unique distributed ledged created for each active tradable index in relation to the investing entity, the unique distributed ledger being a database that is shared, replicated, and synchronized among a plurality of nodes of a decentralized network;

transfer the entry created in the unique distributed ledger to each node of the plurality of nodes of the decentralized network;

receive a second entry created for the unique distributed ledger from a node of the plurality of nodes on the decentralized network;

determine whether the second entry is non-fraudulent based on i) a consensus protocol with each node of the plurality of nodes of the decentralized network, ii) cryptographic hashes, and iii) digital signatures; and append the second entry in the unique distributed ledger when the second entry is determined to be non-fraudulent.

9. The rebalancing trading proposal arrangement according to claim 8, wherein the unique distributed ledger stores the information about an investing entity that views the active tradable index and a rebalancing trade that has been accepted by an investing entity in order to follow the rebalancing trade.

10. The rebalancing trading proposal arrangement according to claim 9, wherein the unique distributed ledger is blockchain.

11. The rebalancing trading proposal arrangement according to claim 9, wherein, each time at least one of the active tradable index is changed, used to determine rebalancing trades are needed to follow the active tradable index, and a rebalancing trade has been accepted by an investing entity in order to follow the active tradable index, an entry is created in the unique distributed ledger.

12. The rebalancing trading proposal arrangement according to claim 8, wherein the at least one processor is further arranged to:

transfer an order to execute the accepted rebalancing trade to a trade executing party; and receive information about executed rebalancing trades from the trade executing party.

13. The rebalancing trading proposal arrangement according to claim 8, wherein the at least one processor is further arranged to:

receive settings made by the investing entity; and in response to such settings, display at least one of i) combinations, ii) adaptions, and iii) combinations and adaptations of active tradable indices on the investing entity interface.

14. A method of proposing rebalancing trades of financial instruments, the method comprising, for an investing entity:

transferring at least one active tradable index from an index provider to a rebalancing trading proposal arrangement;

displaying the at least one active tradable index on an investing entity interface;

inputting a selection of at least one of the displayed active tradable indices on the investing entity interface;

storing the selection of the at least one active tradable index as information about active tradable indices selected in a storage;

inputting an amount designated to follow the selected at least one active tradable index on the investing entity interface;

retrieving information regarding assets owned by the investing entity from the storage;

determining the rebalancing trades needed to follow the selected at least one active tradable index, based on the assets owned by the investing entity and the amount designated to follow the index;

displaying the rebalancing trades needed to follow the selected at least one active tradable index on the investing entity interface;

for each of the displayed rebalancing trades, displaying the option to accept or decline the rebalancing trade on the investing entity interface;

inputting an acceptance of a displayed rebalancing trade on the investing entity interface;

storing information regarding the acceptance of the displayed rebalancing trade as information about rebalancing trades accepted in the storage;

retrieving the stored information about active tradable indices selected and rebalancing trades accepted from the storage;

transferring the information about active tradable indices selected and rebalancing trades accepted to the index provider;

create, for each active tradable index of the active tradable indices transferred to the index provider device, an entry into a unique distributed ledger the unique distributed ledged created for each active tradable index in relation to the investing entity, the unique distributed ledger being a database that is shared, replicated, and synchronized among a plurality of nodes of a decentralized network;

transfer the entry created in the unique distributed ledger to each node of the plurality of nodes of the decentralized network;

receive a second entry created for the unique distributed ledger from a node of the plurality of nodes on the decentralized network;

determine whether the second entry is non-fraudulent based on i) a consensus protocol with each node of the plurality of nodes of the decentralized network, ii) cryptographic hashes, and iii) digital signatures; and append the second entry in the unique distributed ledger when the second entry is determined to be non-fraudulent.

15. The method according to claim 14, wherein the storing of the selection of the at least one active tradable index, and the storing of the information regarding the accept of the displayed rebalancing trade, comprise, for each active tradable index, creating an entry in the unique distributed ledger, wherein the unique distributed ledger storing the information about each investing entity that views the active tradable index and a rebalancing trade that has been accepted by an investing entity in order to follow the rebalancing trade.

16. The method according to claim 15, wherein the unique distributed ledger is blockchain.

17. The method according to claim 15, wherein each time at least one of the active tradable index is changed, used to determine rebalancing trades are needed to follow the active tradable index, and a rebalancing trade has been accepted by an investing entity in order to follow the active tradable index, an entry is created in the unique distributed ledger.

18. The method according to claim 14, further comprising:
transferring an order to execute the accepted rebalancing trade to a trade executing party; and
receiving information about executed rebalancing trades from the trade executing party.

19. The method according to claim 14, further comprising:
receiving settings made by the investing entity,
wherein the displaying of the at least one active tradable index on the investing entity interface comprises, in response to such settings, displaying at least one of i) combinations, ii) adaptions, and iii) combinations and adaptations of active tradable indices on the investing entity interface.

20. A non-transitory computer readable medium comprising a set of instructions which, when executed by at least one processor of an investing entity device, causes the at least one processor to:
display an investing entity interface on a display of the investing entity device;
display at least one active tradable index, received from an index provider, on the investing entity interface;
receive input corresponding to a selection of at least one displayed active tradable index, and an amount designated to follow the at least one active tradable index, from an input device of the investing entity device;
transfer the selection of the at least one displayed active tradable index, and the amount designated to follow the at least one active tradable index, to a rebalancing trading proposal arrangement;
receive information from the rebalancing trading proposal arrangement regarding the rebalancing trades determined to be needed to follow the selected at least one active tradable index;
display the rebalancing trades determined to be needed to follow the selected at least one active tradable index on the investing entity interface;
for each of the displayed rebalancing trades, display the option to accept or decline the rebalancing trade on the investing entity interface;
receive input corresponding to an acceptance of a displayed rebalancing trade from the input device;
transfer information regarding the acceptance of the displayed rebalancing trade to the rebalancing trading proposal arrangement;
create, for each active tradable index of the active tradable indices transferred to the index provider device, an entry into a unique distributed ledger, the unique distributed ledged created for each active tradable index in relation to the investing entity, the unique distributed ledger being a database that is shared, replicated, and synchronized among a plurality of nodes of a decentralized network;
transfer the entry created in the unique distributed ledger to each node of the plurality of nodes of the decentralized network;

receive a second entry created for the unique distributed ledger from a node of the plurality of nodes on the decentralized network;

determine whether the second entry is non-fraudulent based on i) a consensus protocol with each node of the plurality of nodes of the decentralized network, ii) cryptographic hashes, and iii) digital signatures; and append the second entry in the unique distributed ledger when the second entry is determined to be non-fraudulent.

* * * * *